United States Patent [19]

Norwood et al.

[11] Patent Number: 5,323,384

[45] Date of Patent: Jun. 21, 1994

[54] METHOD FOR ESTABLISHING COMMUNICATION BETWEEN TASKS OF A LIMITED NUMBER OF REPEATERS IN A COMMUNICATION SYSTEM

[75] Inventors: Steven E. Norwood, Schaumburg; Mary K. Leatherman, Elgin, both of Ill.

[73] Assignee: Motorola, Inc., Schaumburg, Ill.

[21] Appl. No.: 996,236

[22] Filed: Dec. 23, 1992

[51] Int. Cl.$^5$ .................... H04J 1/16; H04L 12/28; H04B 1/00

[52] U.S. Cl. .................................. 370/16; 370/85.1; 370/95.1; 379/58; 371/11.1; 455/53.1

[58] Field of Search ............... 370/16, 58.3, 60, 60.1, 370/75, 85.1, 85.15, 92, 94.1, 94.2, 94.3, 95.1, 95.3, 124, 110.1; 379/58, 59, 63, 221; 371/8.1, 9.1, 11.1, 11.3; 455/33.1, 53.1, 54.1, 54.2, 56.1; 340/825.01, 825.52, 825.53

[56] References Cited

U.S. PATENT DOCUMENTS 4,926,495  5/1990  Comroe et al. ................ 455/54.2
5,117,501  5/1992  Childress et al. ................ 455/56.1
5,212,724  5/1993  Nazarenko et al. ................ 379/58
5,253,253 10/1993  Brame et al. ................ 370/95.1

*Primary Examiner*—Wellington Chin
*Assistant Examiner*—Hassan Kizou
*Attorney, Agent, or Firm*—Timothy W. Markison

[57] ABSTRACT

Communication between tasks within repeaters of a communication system can be improved in the following manner. Each repeater determines its repeater configuration which includes identifying any peripheral devices affiliated with the repeater. Next the repeaters establish which repeater will be the master repeater based on a predetermined protocol. A predetermined number of tasks is allocated among the repeaters based on which repeater is established as the master repeater and each repeater configuration. Finally, message routing tables are created based on the allocated trunking tasks, peripheral devices, and communication system configuration. The message routing tables are used in routing messages between tasks in the communication system.

11 Claims, 7 Drawing Sheets

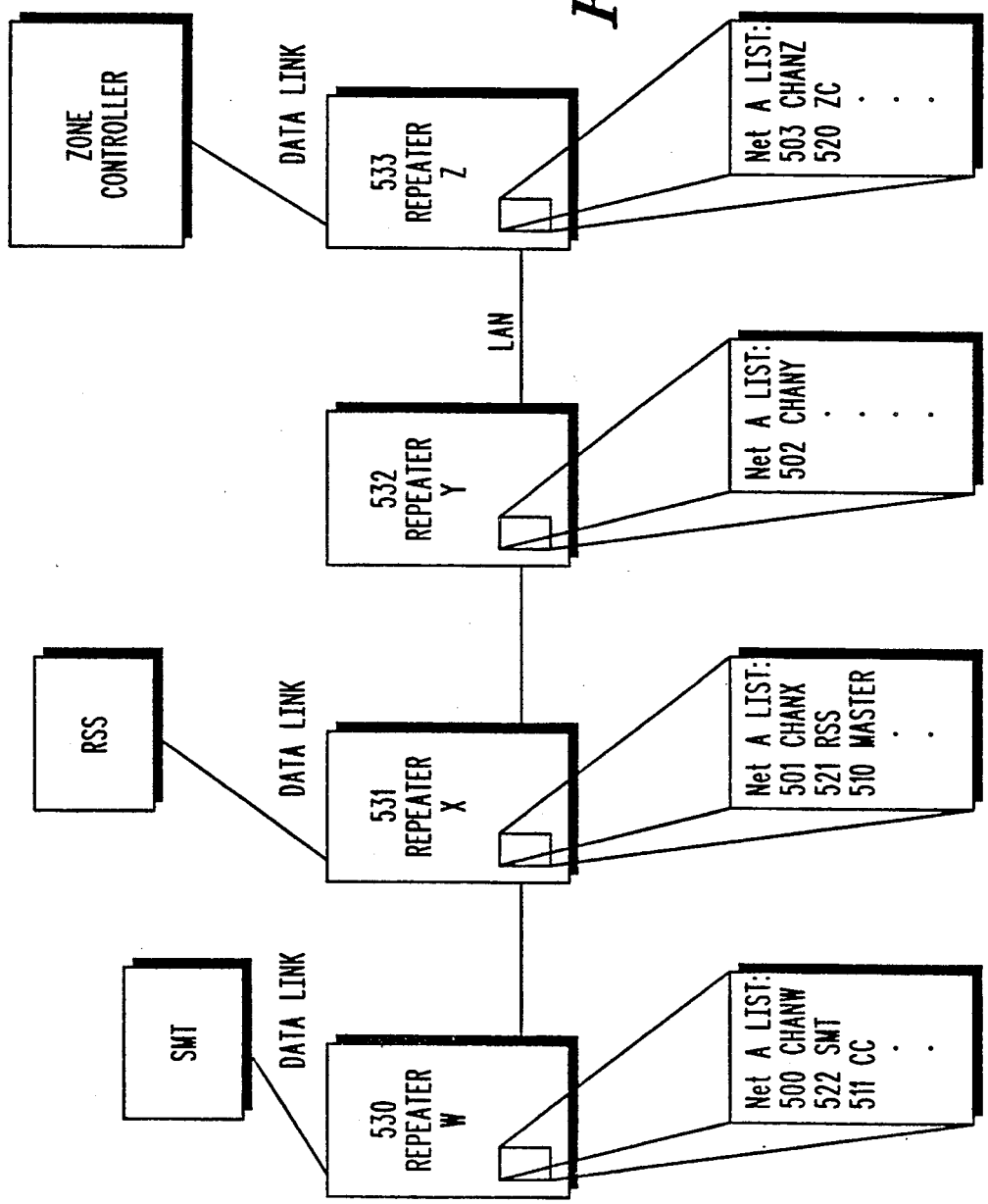

FIG.6

| MESSAGE OPCODE | Net A | Net A | Net A |
|---|---|---|---|
| 601 SITE ALARM STATUS | 620 MASTER | | |
| ENABLE REQUEST | 620 MASTER | | |
| DIAGNOSTIC INTERFACE | 630 SRT | | |
| SUSPEND OSW | 621 CC | 620 MASTER | |
| CANCEL BUSY OSW | 621 CC | | |
| DUAL WORD STATUS OSW | 621 CC | | |
| DUAL WORD NEW OSW | 610 CHANZ | 621 CC | |
| DUAL WORD ISW | 620 MASTER | | |
| DISCONNECT AND MUTE | 610 CHANX | | |

FIG.7

| MESSAGE OPCODE | LTI | LTI | LTI |
|---|---|---|---|
| 701 SITE ALARM STATUS | 710 RM | | |
| ENABLE REQUEST | 710 RM | | |
| DIAGNOSTIC INTERFACE | 711 LM | 714 MTS | |
| SUSPEND OSW | 712 VC | | |
| CANCEL BUSY OSW | 712 VC | | |
| DUAL WORD STATUS OSW | 712 VC | 715 CC | |
| DUAL WORD NEW OSW | 712 VC | 715 CC | |
| DUAL WORD ISW | 713 CP | | |
| DISCONNECT AND MUTE | 712 VC | | |

METHOD FOR ESTABLISHING COMMUNICATION BETWEEN TASKS OF A LIMITED NUMBER OF REPEATERS IN A COMMUNICATION SYSTEM

FIELD OF THE INVENTION

This invention relates generally to communication between repeaters in a communication system and, in particular, to communication between tasks of repeaters in a distributed communication system.

BACKGROUND OF THE INVENTION

Communication systems are known to comprise communication units, repeaters, peripheral devices and a central processor. Typically, the central processor performs all system wide tasks within the communication system, such as call processing, and establishes the control channel repeater.

Communication networks are known to comprise communication devices, such as repeaters, which are physically connected to a data link, such as a local area network (LAN). Communication networks allow communication devices to transmit messages to other communication devices and receive messages from other communication devices physically connected to the same data link. Since all communication devices physically connected to the data link receive all messages transmitted on the data link, each communication device has its own unique address. This allows a communication device the option of processing only those received messages addressed specifically to it. The unique address also allows a communication device to transmit messages addressed to a specific communication device.

As is known, the method of task communication between repeaters consists of messages sent via a pool of common buffers. All task processors within each repeater have access to the pool of buffers. Because the buffers are unformatted, when a task processor receives a message, it interprets the message according to its protocol. If a task processor were to receive a message in error, it would process the message according to its protocol as if it were a valid message. This may result in improper operation of the communication system. As is also known, this method requires each task processor to know the physical address of the task processors it needs to communicate with. This requires extra overhead to keep track of changes made to the communication system such as, if a repeater is added or removed from the system, or if a peripheral device is added, removed, or changed to another repeater in the communication system.

Therefore a need exists for a method for establishing transparent communication between a limited number of repeaters in a communication system that decouples tasks from hardware and system configurations, provides centralized buffer management, and requires less overhead.

BRIEF DESCRIPTION OF THE DRAWINGS

FIG. 5 illustrates a network address routing table in accordance with the present invention.

FIG. 6 illustrates an opcode to network address routing table in accordance with the present invention.

FIG. 7 illustrates an opcode to logical task ID routing table in accordance with the present invention.

DESCRIPTION OF A PREFERRED EMBODIMENT

Generally, the present invention distributes system wide tasks among a limited number of repeaters within a communication system. In addition, each repeater is capable of performing all of the system wide and routing tasks, as well as performing all peripheral device tasks for any peripheral devices affiliated with it. The allocation of system wide tasks is determined by a master repeater. The master repeater is established by an active master determination algorithm.

Once the tasks, (system wide, routing, and peripheral device) are active, the communication system can support communications. A communication begins when a peripheral device transmits a message to a repeater. The receiving repeater reads the message to determine if it is required to perform a task. If the receiving repeater is not required to perform a task, it transmits the message on to a local area network (LAN). The other repeaters in the communication system read the message from the LAN to determine if they are required to perform a task. The repeater(s) that are required to perform a task, perform that task and then determine whether they are required to perform a subsequent task, or required to transmit the task resultant to the LAN or a peripheral device. Tasks are performed until the resultant is destined for a peripheral device. Once the result is transmitted to the peripheral device, the process ends for this message.

Figure 1:
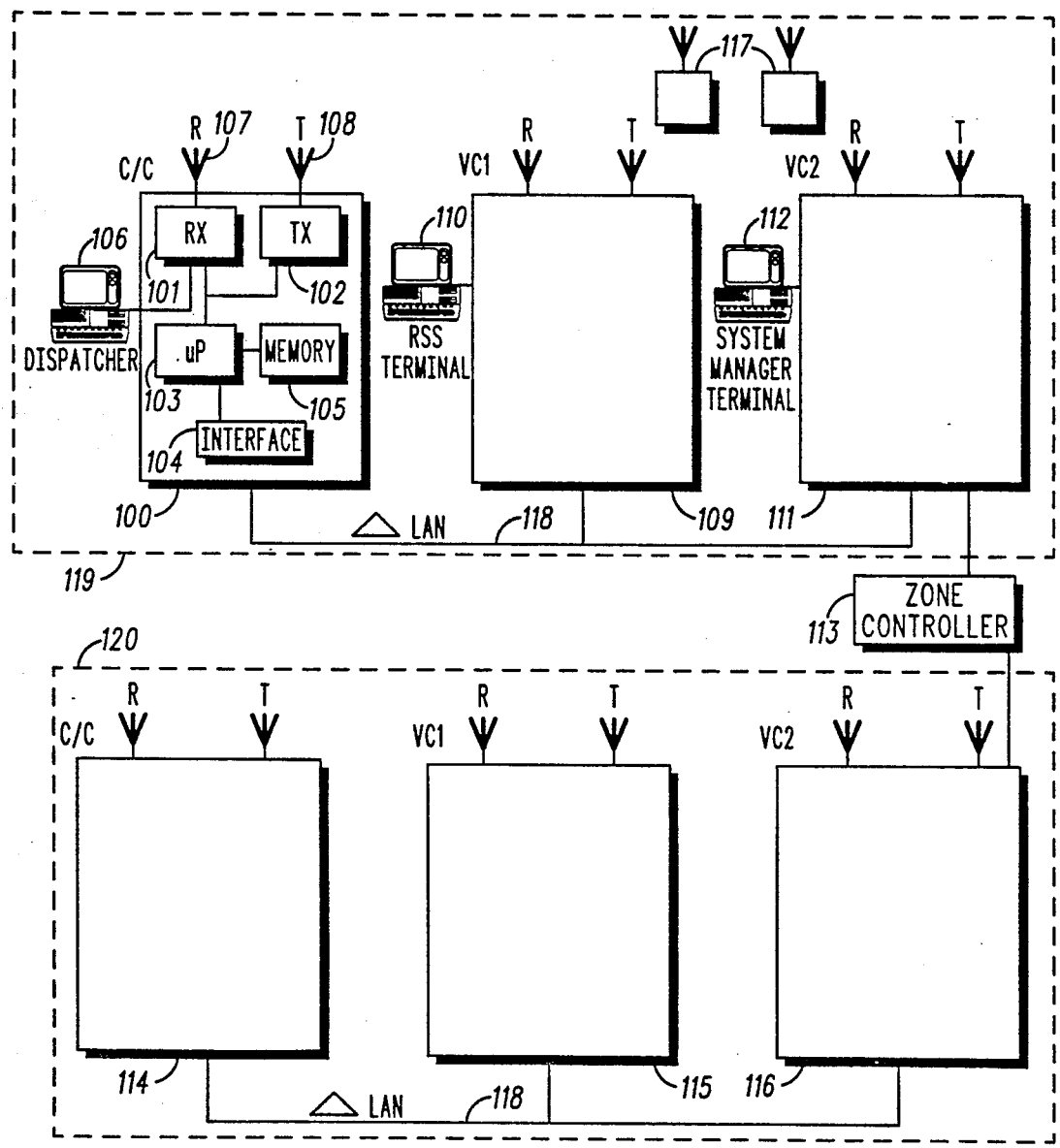
FIG. 1 illustrates a communication system network in accordance with the present invention.

The present invention can be more fully described with reference to FIGS. 1-7. FIG. 1 illustrates a communication system network that includes two stand alone communication systems 119 and 120, which, if connected by a zone controller 113, form a widearea communication system. Each communication system 119 or 120 includes a limited number of repeaters (only three shown per system) 100, 109, 111 and 114, 115, 116 which are connected via a LAN 118, and a plurality of peripheral devices such as communication units 117, a dispatcher station 106, radio service software (RSS) terminal 110, and a system manager terminal (SMT) 112. Each repeater 100, 109, 111, 114, 115, 116 includes a receiver 101, a transmitter 102, a microprocessor 103, a LAN interface 104, memory 105, a receive antenna 107 and a transmit antenna 108. For purposes of this discussion, the zone controller 113, is considered a peripheral device.

Each communication unit 117 communicates to the control channel 100 via an inbound-signaling-word (ISW) and receives communication from the control channel via an outbound-signaling-word (OSW). ISWs and OSWs are transmitted via radio frequencies (RF). Communication units 117 may comprise a Motorola JEDI portable or a Motorola SPECTRA mobile. As is known, the dispatcher station 106 simulates a communication unit using ISWs & OSWs to communicate to the control channel. In addition, the RSS terminal 110 is used to configure each repeater's internal hardware and the SMT 112 is used to configure system wide functions and display realtime system status. The RSS terminal 110 and SMT 112, as is known, are each connected to a repeater via an independent data link port. Both the RSS terminal 110 and SMT 112 communicate via a known trunking protocol (link protocol).

Each repeater 100 is capable of supporting multiple independently configurable data links, redundant networks, and channel processing (voice or control). Each message transmitted over the LAN is of type broadcast, wherein each message is received by all repeaters. Thus, each repeater must determine if a message is addressed to it.

A repeater device is capable of providing the following services: voice channel (VC), control channel (CC), master (M), master-agent (MA), and peripheral agent (PA). Upon powerup, the repeater's microprocessor (uP) reads the repeater's hardware configuration (HC) from its local memory space. The HC information is used to initialize and activate the repeater's hardware devices such as data link ports, transmitter, receiver, and LAN ports.

Following its hardware initialization, the repeater will initiate software tasks. Tasks are programs which run nonconcurrent (when one task is running, all other tasks are idle). All tasks are initialized: system wide, i.e. trunking application tasks, peripheral device tasks and transparent routing tasks. Trunking application tasks include call processing (CP), resource management (RM), voice channel processing (VC), and control channel processing (CC). Peripheral device tasks include link manager (LM) and link handler (LH). Transparent routing tasks include message transfer system (MTS) and dlan processor (DLAN). When a trunking task wants to communicate to a second trunking task, it will call a mail service to send a message addressed to a logical task ID. Transparent routing tasks work together within a repeater and across repeaters to provide a virtual machine to the trunking tasks. Transparent routing tasks convert logical task IDs to physical addresses, route messages over physical devices, receive messages over physical devices, and reconvert messages to logical representation before delivery to a destination trunking task. Peripheral device tasks facilitate communication between a repeater and an affiliated peripheral device.

Following software initialization, the message transfer system (MTS) generates four routing tables: inter-task communication (ICI), network address (NetA), opcode to network address (OPC-NetA), and opcode to logical task ID (OPC-LTI).

Figure 4:
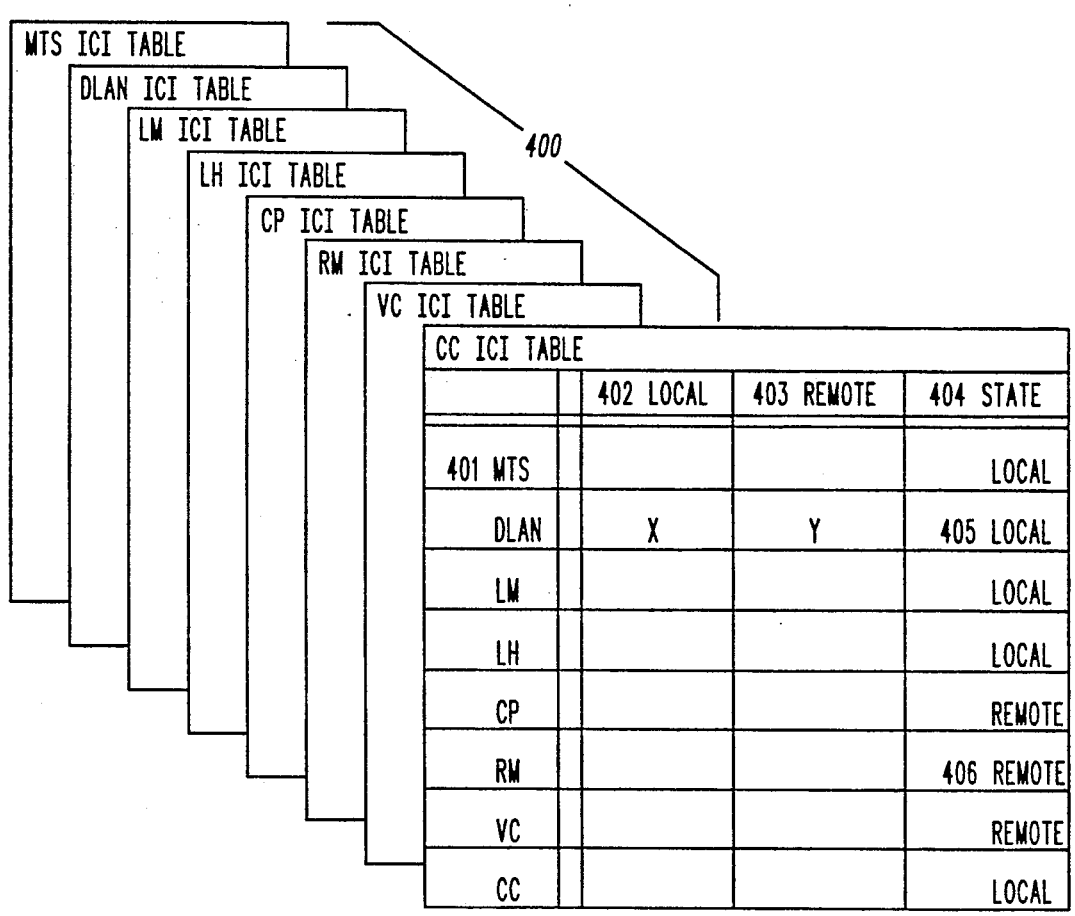
FIG. 4 illustrates an intertask communication routing table in accordance with the present invention.

The ICI table format is illustrated by FIG. 4. For each task within a repeater, a unique ICI table 400 will be generated. The function of an ICI table is to logically map a task to every other task within a repeater. The table is indexed 401 via the logical task id of the destination task. Each table entry contains three fields local address 402, remote address 403, and state flag 404. If a task is actively running on this repeater (the state flag is set to local 405), the local record will be used to retrieve the physical address of the task. If the task is running outside of this repeater (the state flag is set to remote 406), the remote record will be used to retrieve the physical address of a routing task. During repeater operation, when a task wants to communicate to a second task, it will call a mail service. The mail service will use the logical task ID to index into the source task's ICI table, and retrieve a physical task address based on the state flag. This physical address is used to insert the message into the destination task's mailbox.

The NetA list is illustrated by FIG. 5. The NetA list contains the repeater's unique channel number 500–503, the system wide tasks performed by this repeater 510–511, and the addresses of affiliated peripheral devices 520–522. The NetA list is dynamically updated by each repeater's MTS task when any change occurs which effects a repeater. Changes include: system wide reallocation of tasks, repeater malfunction, and peripheral device changes. These addresses are used to address devices over the LAN. When a repeater receives a message from the LAN and the message is addressed to one of the receiving repeater's NetA addresses, the receiving repeater will route the message to one or more of its internal tasks. If the message is not addressed to one of the receiving repeater's NetA addresses, the message is discarded.

The OPC-NetA table is illustrated by FIG. 6. The OPC-NetA table 600 is mirrored in all repeaters of the communication system. When a message is received by a routing task (MTS), the message is opened to determine a device address. This device address indicates where the destination task is currently running. The first byte of a message is the message opcode. The opcode is used to index 601 into a row 602 within the OPC-NetA table 600. Each row contains a limited number of device addresses. An address can be a channel number 610, a system wide task 620–621, or a peripheral device 630. MTS will compare each address in the indexed row to each address within the local NetA table. If a match occurs, MTS routes the message to one or more internal destination tasks. If the received message was generated external to this repeater, all unmatched addresses will be discarded. If the message originated from this repeater, MTS generates and transmits a separate message for each unmatched address over the LAN.

The OPC-LTI table is illustrated by FIG. 7. Once it has been determined that a message is for this repeater, MTS needs to determine which are the local task destinations. The OPC-LTI table is mirrored in all repeaters of the communication system. The message opcode is used to index 701 into a row 702 within the OPC-LTI table 700. Each row contains a limited number of logical task IDs 710–715. For each logical task ID, MTS will generate a message copy, forwarding a copy to each destination task. MTS communicates to each task via the mail service outlined in the ICI table discussion above.

Figure 2A:
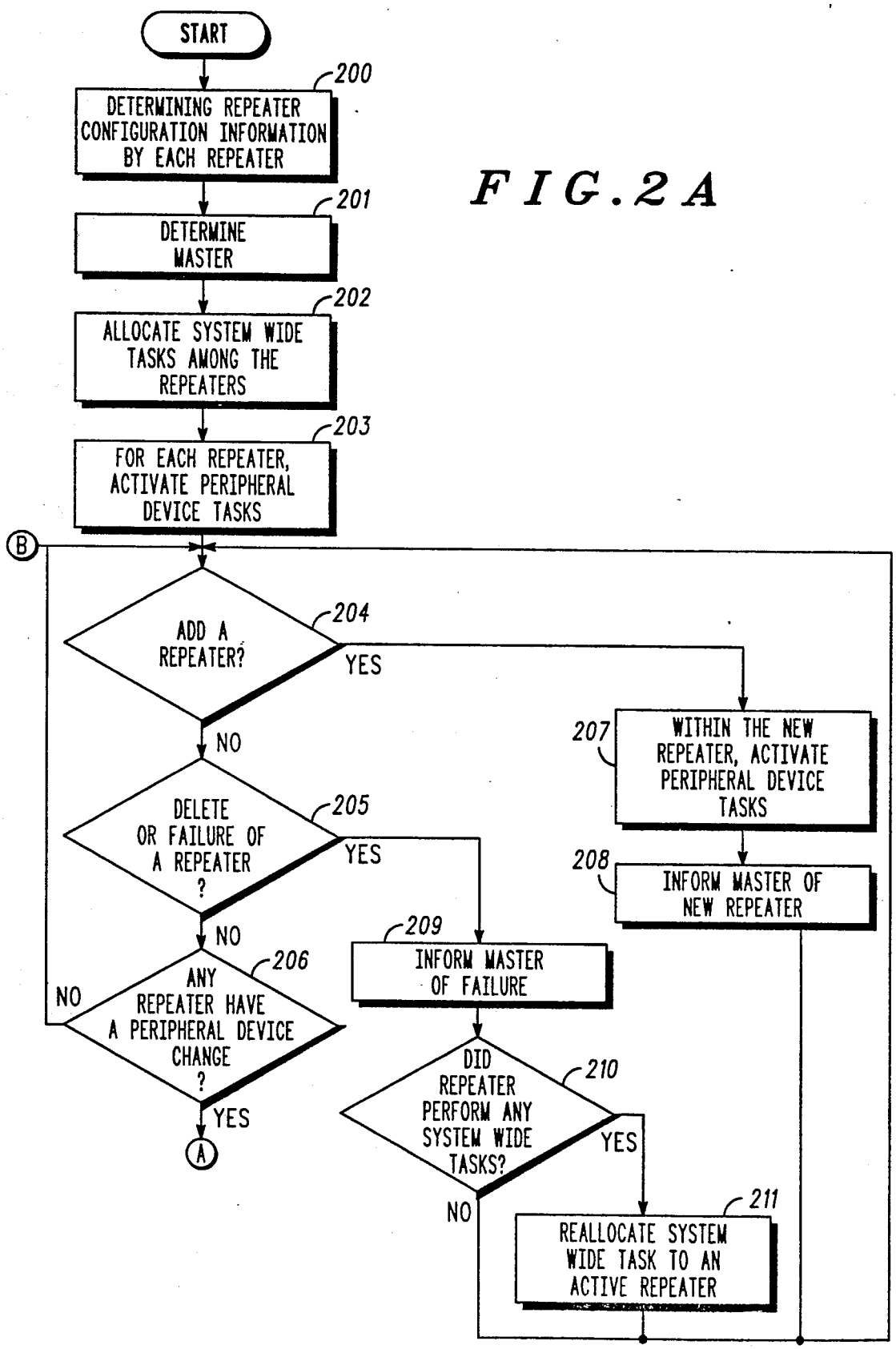
FIGS. 2A and 2B illustrates a logic diagram for establishing a communication system in accordance with the present invention.
Figure 2B:
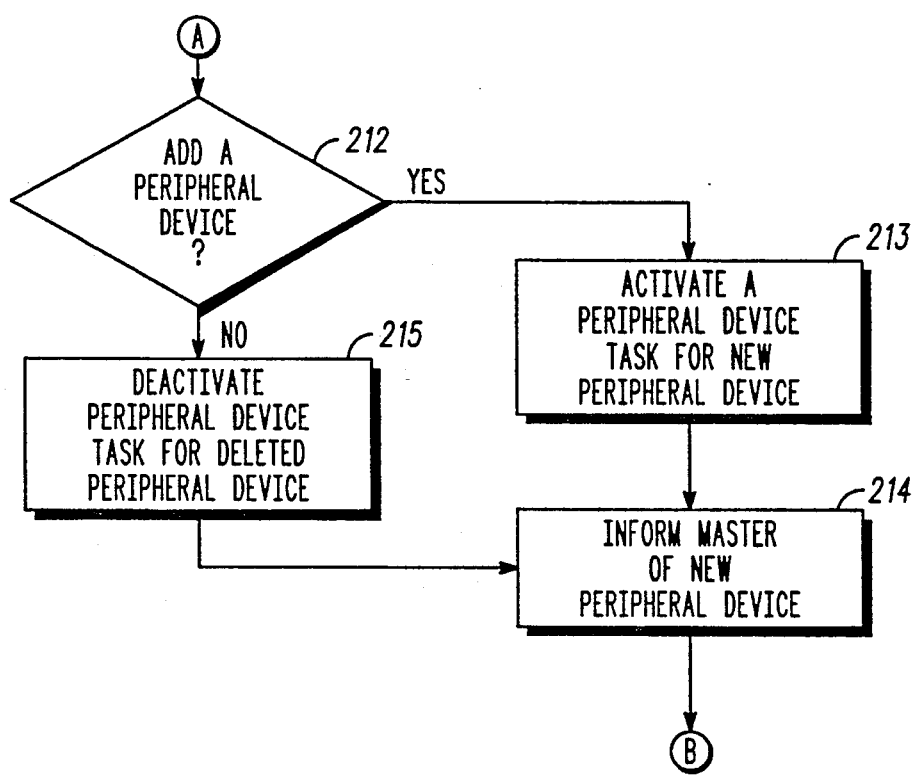

The above describes the internal setup of each repeater, while FIG. 2 illustrates a logic diagram for establishing the communication systems 119 and 120. Upon powerup, each repeater initializes itself using the configuration data stored in its local memory 200. Initialization may comprise: test and activation of its transmitter and receiver, data link and network port configuration, and protocol determination of attached peripheral devices.

Following initialization, each repeater attempts to become the communication system's active master 201. This is achieved by an active master determination algorithm wherein each repeater challenges every other repeater after its unique challenge timer has expired. The repeater with the shortest timer, will have the first opportunity to broadcast its challenge over the LAN.

Receiving repeaters will each agree to the challenge if its local challenge timer has not expired.

Following master establishment, the master repeater allocates system wide tasks across repeaters 202. Allocation includes control channel assignment. After system wide tasks have been allocated, each repeater will activate peripheral device tasks for all peripheral devices affiliated with the repeater.

As the system operates, changes in system configuration may occur. Each repeater will continuously check and adapt to peripheral device changes 206, and the master repeater will continuously track repeater changes 204 and 205.

When a repeater is added 207: the new repeater will initialize itself 200, activate peripheral device tasks for affiliated peripheral devices, and notify the master 208 of the added repeater. Upon notification of the added repeater, the master will add the new repeater's channel number and affiliated peripheral devices to the communication system's pool of available resources.

When a repeater is removed or fails 209, the master repeater is notified of the removed or failed repeater. Upon notification of the removal or failure of the repeater, the master repeater updates the communication system's pool of available resources, and checks whether the removed or failed repeater had been performing any system wide task 210. If the removed or failed repeater was allocated any system wide task, the master repeater reallocates all system wide tasks allocated to the removed or failed repeater to other functioning repeaters in the communication system 211.

When a peripheral device is added to the communication system 213, the repeater affiliated with the peripheral device activates a peripheral device task to communicate with the peripheral device 213. The repeater affiliated with the peripheral device notifies the master repeater 214 of the added peripheral device. When the master is notified of the added peripheral device, it updates the communication system's pool of available resources.

When a peripheral device is removed from the communication system, the repeater previously affiliated with the removed peripheral device deactivates the peripheral device task to communicate with the peripheral device 215. The repeater previously affiliated with the removed peripheral device notifies the master repeater 214 of the removed peripheral device. When the master is notified of the removed peripheral device, it updates the communication system's pool of available resources.

A special case of peripheral change 213 and 215, is communication to the Zone Controller (ZC). If communication to the ZC is severed during widearea operation, the communication system will return to the master determination step 201. If communication to the ZC is established, the current established master repeater will complete any remaining active calls and relinquish allocation of the system resources to the ZC. Upon relinquishment, the communication system will return to reallocation of system wide tasks 202.

Figure 3:
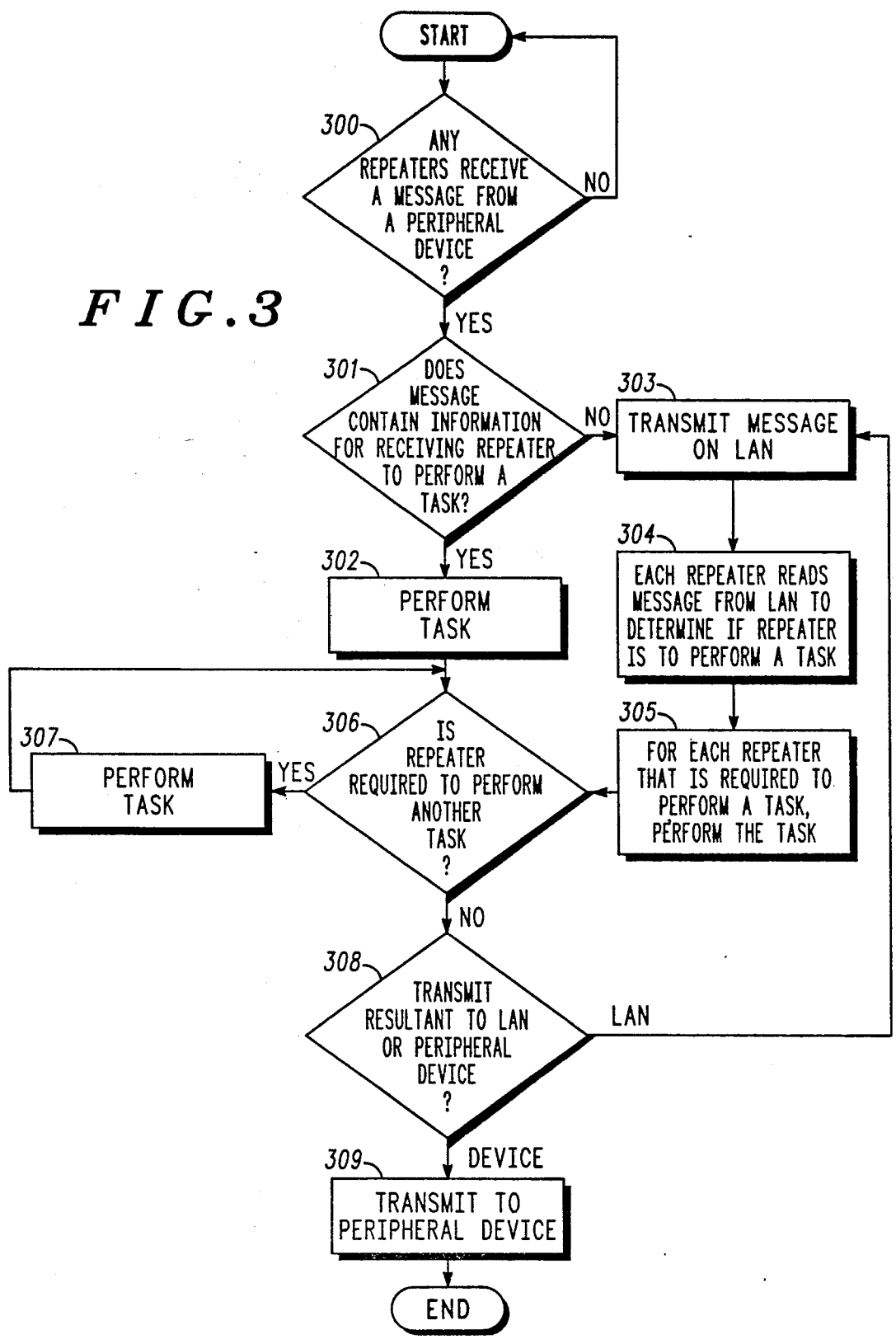
FIG. 3 illustrates a logic diagram for a communication system of the present invention to support communications.

Once the communication system is established as described above, communication can be processed by the logic diagram of FIG. 3. A communication is triggered by a message from a peripheral unit to a repeater 300. The message can be generated by: a communication unit 117 and 106, a Zone Controller 113, a RSS terminal 110, a system manager terminal 112, or a repeater 100.

Upon message receipt, the MTS task of the receiving repeater will determine whether it needs to perform a task 301. There are 3 steps to this process: destination identification, local destination determination, and message routing. Destinations are identified by indexing into the OPC-NetA table 600. The index used is the message opcode (first byte of message). Indexing will result in a row of destination devices. These devices are then checked against the local NetA List. If a match occurs, the repeater will route the message locally. For each device that did not match, the repeater creates a message copy and transmit the message copy over the LAN.

Local destinations are identified by indexing into the OPC-LTI table 700. The index used is the message opcode. Indexing results in a row of destination tasks. For each destination task, a message copy is created and forwarded. Each receiving task performs the task required 302 and checks whether it is required to perform a subsequent task 306.

If a subsequent task is required 306, the task will call a local mail service to deliver the incomplete resultant to the next task 307. Tasks communicate to other logical tasks. Tasks are unaware of where any other task physically resides. When a task calls the mail service, it passes to the mail service a logical task ID and the message. The mail service will use the logical task ID to index into the ICI table 400. Indexing results in a local address, a remote address, and a state flag. If the destination task is currently operating at this repeater, the state flag will indicate local. If the state flag is local, the mail service will use the local address to forward the message to the local task's mailbox. The local task will perform the task upon message receipt 306. If the state flag is remote, the mail service will forward the message to MTS. MTS will repeat step 301 as outlined above.

A repeater will continue to perform a required task until the string of required tasks is complete (307, 306, 307, 306 . . . ). After performing the sequence of required tasks, the repeater will check whether the transaction is complete, or needs further processing. If the transaction is complete, the repeater will determine whether to send the resultant of the transaction to a peripheral device or to the LAN 308. If the repeater determines to transmit the resultant over the LAN 303, it transmits the task resultant over the LAN. If the repeater determines to transmit the resultant to its affiliated peripheral device, it transmits the resultant to its affiliated peripheral device 309. Transmission of the final resultant concludes the message transaction for this path of the logic diagram.

Upon message receipt 300, if the receiving repeater determines that is not required to perform a task 301, it transmits the message over the LAN 303. Each receiving repeater, reads the message to determine if it is required to perform a task 304. If a repeater is not required to perform a task, it discards the received message. If a repeater is required to perform a task, it performs the task 305 and checks whether it is required to perform a subsequent task 306. A repeater will continue to perform a required task until the string of required tasks is complete (307, 306, 307, 306 . . . ). After performing the sequence of required tasks, the repeater checks whether the transaction is complete, or needs further processing. If the transaction is complete, it transmits the task resultant over the LAN or to a peripheral device. Transmission of the final resultant concludes the message transaction for this path of the logic diagram.

If a repeater has determined that it has completed its string of required tasks 308, and that the message needs further processing 303, it will transmit the message to the LAN. Repeaters will continue to process 304, 305, 306, 307 and forward an incomplete resultant 303, until the message resultant is complete. Upon completion of the final message resultant, the terminating repeater forwards the resultant to the LAN if the destination is a repeater, or to its affiliated peripheral device 309. Transmission of the final resultant concludes the message transaction.

One example of a typical communication transaction is the assignment of a channel after receiving a channel request. When a subscriber initiates a push-to-talk request, on the communication unit 117, this request is converted at the communication unit, to an inbound-signalling-word (ISW). ISWs are communicated using radio frequencies (RF) to the control channel repeater. Once received, the control channel task, within the control channel repeater, processes the ISW by forwarding the request to the call processing task (CP).

When a task wants to send a message to a second task, it calls the mail service. The sending task gives the mail service the logical task ID and the message. In this case, the logical task id is CP. The mail service will use CP to index into the CC ICI table 400. Indexing results in a local address, a remote address, and a state flag which is set to remote. The mail service uses the remote address to forward the message to the MTS task.

Upon message receipt, the MTS task of the control channel, repeater W 530, uses the message opcode "Dual Word ISW" 601 to index into the OPC-NetA table 600. Indexing will result in a row of "MASTER" 620. Because the control channel and the master functionality should not reside in the same repeater, the "MASTER" address is not in repeater W's local NetA List FIG. 5. The CC address resides in repeater W's NetA List, while the MASTER address resides in repeater X's 531 NetA List. As a result, the MTS task of repeater W will transmit the message over the LAN addressed to the MASTER device.

Each repeater receives the LAN message, and checks whether the MASTER address is present within its local NetA List. With reference to FIG. 5, repeaters (W,Y,Z) 530, 532, 533 fails to match, while repeater X 531 matches. Repeaters (W,Y,Z) 530, 532, 533 discards the message, while repeater X 531 processes the request.

The first step repeater X's MTS task performs is the same process that repeater W's MTS task performed. Upon message receipt, repeater X's MTS task uses the message opcode "Dual Word ISW" 601 to index into the OPC-NetA table 600. Indexing results in a row of "MASTER" 620. Because repeater X is the master, the "MASTER" address appears in repeater X's local NetA List. This sounds like a repeat, since the repeater knows that the message is for the MASTER, but it makes it transparent to MTS processing whether the message came from a local task or from a remote task.

Next, repeater X's MTS task uses the message opcode "Dual Word ISW" 701 to index into the OPC-LTI table 700. Indexing results in a row of CP 713. Repeater X's MTS task calls the local mail service and passes CP as the logical task ID and the message. Using the ICI table 400, when CP is used to index repeater X's MTS ICI table, the state flag will be set to local. The message is sent to CP's mailbox. This completes one step of the transaction, ISW to call processing.

After CP completes its required set of tasks, it generates an OSW message to send to the original communication unit. As is known, OSWs tell the user that a channel has been assigned and inform the idle channel that it has been assigned. As a result the OSW message needs to be sent to two network destinations and one peripheral destination. When CP sends the OSW to CC, it calls the mail service, passing the service CC as the logical task id along with an OSW message. Indexing results in a state flag set to remote. The mail service delivers the OSW message to the MTS task.

The MTS task of repeater X uses the message opcode of "Dual Word New OSW" 601 to index into the OPC-NetA table 600. This will index a row of "CC, ChanZ". MTS checks each address against its local NetA List. Both addresses fail. MTS then creates two message copies and transmit each over the LAN with one addressed to CC and one addressed to ChanZ.

All repeaters receives each message. Repeater W will process the message addressed to CC, repeater Z will process the message addressed to ChanZ. All other repeaters will discard the messages. Both MTS tasks (repeater W and repeater Z) use the message opcode of "Dual Word New OSW" 601 to index into the OPC-NetA table 600. This will index a row of "CC, ChanZ". Each repeater's MTS task checks each address against its local NetA List. The message addressed to ChanZ fails for repeater W and the message addressed to CC fails for repeater Z. Because the message was received from the LAN, the unmatched addresses are discarded and no new LAN message generated.

Next, both MTS tasks (repeater W and repeater Z) use the message opcode "Dual Word New OSW" 701 to index into the OPC-LTI table 700. Indexing results in a row of VC 712 and CC 715. From this, MTS creates two copies in both cases and calls the mail service to deliver. Although the mail service delivers the message to the CC task on repeater Z, the CC task knows it is idle, and discards the OSW message. The message sent to the VC task on Z results in a final resultant delivery and VC will commence to providing channel services.

Although the mail service delivers the message of the OSW to the VC task on repeater W, the VC task on repeater W knows from the message that the channel number is Z and discards the message. The delivery to the CC task on repeater W, results in a transfer of the OSW to the original communication unit user. This results in the final resultant delivery.

The present invention provides a universal mechanism for task communication. A task typically communicates to a logical destination. The present invention provides centralized buffer management, logical to physical address translation and transparent external routing. The present invention simplifies task interfaces, increases software understanding, and reduces code overhead. The prior art has messages communicated via a common pool of message buffers. All tasks own all buffers. A buffer is typically propagated between several task. It is hard to maintain and enhance this software because the paths of communication are unclear and distributed. Also in the prior art, these buffers are unformatted, thus, each receiving task will interpret a received buffer according to its set of buffer definitions. If a task were to receive a buffer due to an erroneous buffer transfer, the receiving task would process the buffer as if it were valid.

We claim:

1. In a communication system that includes a limited number of repeaters, a plurality of peripheral devices, and a local area network, LAN, wherein each of the limited number of repeaters are operably coupled to one another via the LAN, a method for establishing communication between the limited number of repeaters, the method comprises the steps of:
a) determining, by each of the limited number of repeaters, repeater configuration information, wherein the repeater configuration information includes information pertaining to which peripheral devices of the plurality of peripheral devices are affiliated with the repeater;
b) establishing a master repeater of the limited number of repeaters at power up or after a failure based on a predetermined protocol; and
c) allocating a predetermined number of tasks among the limited number of repeaters based upon which repeater is established as the master repeater and the repeater configuration information of each of the limited number of repeaters.

2. The method of claim 1 further comprises, when a repeater is added to the communication system, activating at least one predetermined task within the added repeater based on the peripheral devices affiliated with the added repeater.

3. The method of claim 1 further comprises, when one of the limited number of repeaters becomes inactive to produce an inactive repeater,
determining whether the inactive repeater was allocated at least one system wide task of the predetermined number of tasks; and
when the inactive repeater was allocated at least one system wide task, allocating the at least one system wide task to at least one of the other limited number of repeaters based on a second predetermined protocol.

4. In the method of claim 1, step (c) further comprises allocating a call processing task of the predetermined number of tasks to the master repeater.

5. The method of claim 1 further comprises modifying, for a particular repeater of the limited number of repeaters, allocation of peripheral device tasks of the predetermined number of tasks based upon addition or deletion of a peripheral device to the particular repeater.

6. The method of claim 1 further comprises, when the communication system is coupled into a network of communication systems, wherein the network includes a zone controller, activating, within one of the limited number of repeaters, a peripheral device task of the predetermined number of tasks to interface the communication system with the zone controller.

7. In a communication system that includes a limited number of repeaters, a plurality of peripheral devices, and a local area network, LAN, wherein the limited number of repeaters are operably coupled to one another via the LAN, a method for communicating information throughout the communication system, the method comprises the steps of:
a) receiving, by a particular repeater of the limited number of repeaters, a message generated by a peripheral device that is affiliated with the particular repeater;
b) determining, by the particular repeater, whether the message contains information that requires the particular repeater to perform at least one predetermined task;
c) when the message contains information that requires the particular repeater to perform the at least one task, performing the at least one predetermined task by the particular repeater;
d) when the message does not contain information that requires the particular repeater to perform the at least one task, transmitting the message on the LAN; and
e) upon receiving the message from the LAN, determining, by at least a second repeater of the limited number of repeaters, whether the message contains information that requires the second repeater to perform at least one predetermined task.

8. In the method of claim 7, step (c) further comprises, after the at least one predetermined task is performed to produce tasked information, determining whether to route the tasked information to the LAN or to a peripheral device affiliated with the particular repeater.

9. The method of claim 7 further comprises, when the message contains information that requires the second repeater to perform the at least one predetermined task, performing, by the second repeater, the at least one predetermined task to produce tasked information.

10. The method of claim 9 further comprises determining whether to route to tasked information to the LAN or to a peripheral device affiliated with the second repeater.

11. An improved repeater that is used in a communication system, wherein the communication system includes a limited number of improved repeaters, a plurality of peripheral devices, and a local area network, LAN, wherein the limited number of improved repeaters are operably coupled to one another via the LAN, wherein the improvement comprises:
task means for storing and executing at least one task of a predetermined number of tasks;
interface means for coupling the repeater to the local area network;
receiver means for receiving messages from peripheral devices that are affiliated with the repeater; and
task determination means, operably coupled to the task means, the receiver means, and the interface means, for determining whether messages on the LAN or messages received by the receiver means contain information that require the task means to perform one of the at least one task.

* * * * *